United States Patent [19]

Karlsson et al.

[11] E Patent Number: Re. 33,453

[45] Reissued Date of Patent: Nov. 20, 1990

[54] BEARING ARRANGEMENT WITH A SEAL

[75] Inventors: Ove Karlsson; Sture Ostling, both of Katrineholm; Rune Adolfsson, Boras, all of Sweden

[73] Assignee: SKF Mekanprodukter AB, Gothenburg, Sweden

[21] Appl. No.: 417,795

[22] Filed: Oct. 5, 1989

Related U.S. Patent Documents

Reissue of:

[64] Patent No.: 4,697,937
Issued: Oct. 6, 1987
Appl. No.: 937,830
Filed: Dec. 4, 1986

[30] Foreign Application Priority Data

Jan. 24, 1986 [SE] Sweden ..... 8600310

[51] Int. Cl.[5] ..... F16C 19/38

[52] U.S. Cl. ..... 384/486; 384/538; 384/577; 384/585

[58] Field of Search ..... 384/486, 147, 585, 538, 384/489, 477, 577, 272

[56] References Cited

U.S. PATENT DOCUMENTS

| | | | |
|---|---|---|---|
| Re. 26,591 | 5/1969 | Kay | 384/585 |
| 3,129,038 | 4/1964 | Benson | 384/585 |
| 3,912,412 | 10/1975 | Struttmann | 384/538 |
| 4,512,672 | 4/1985 | Olschewski et al. | 384/486 |
| 4,697,937 | 10/1987 | Karlsson et al. | 384/585 |

*Primary Examiner*—Lenard A. Footland
*Attorney, Agent, or Firm*—Eugene E. Renz, Jr.

[57] ABSTRACT

A bearing housing (3) encloses a bearing (2) for a shaft (1). The bearing is mounted on the shaft by a clamping sleeve (4) with a longitudinal slit and two flanges (5,6) one on each side of the bearing. The flanges, which are axially fixed on the sleeve, are parts of mounting and dismounting means for a bearing. The bearing space is sealed by sealing members which surround the flanges [and], *In a preferred embodiment, the sealing members* have lips (12,13) contacting the outer surfaces of said flanges. Resilient sealing rings (10,11) are arranged between the flanges and the inner ring of the bearing. The sealing arrangement allows the use of a slitted clamping sleeve and axial displacement of the bearing on the shaft (1) during mounting.

5 Claims, 1 Drawing Sheet

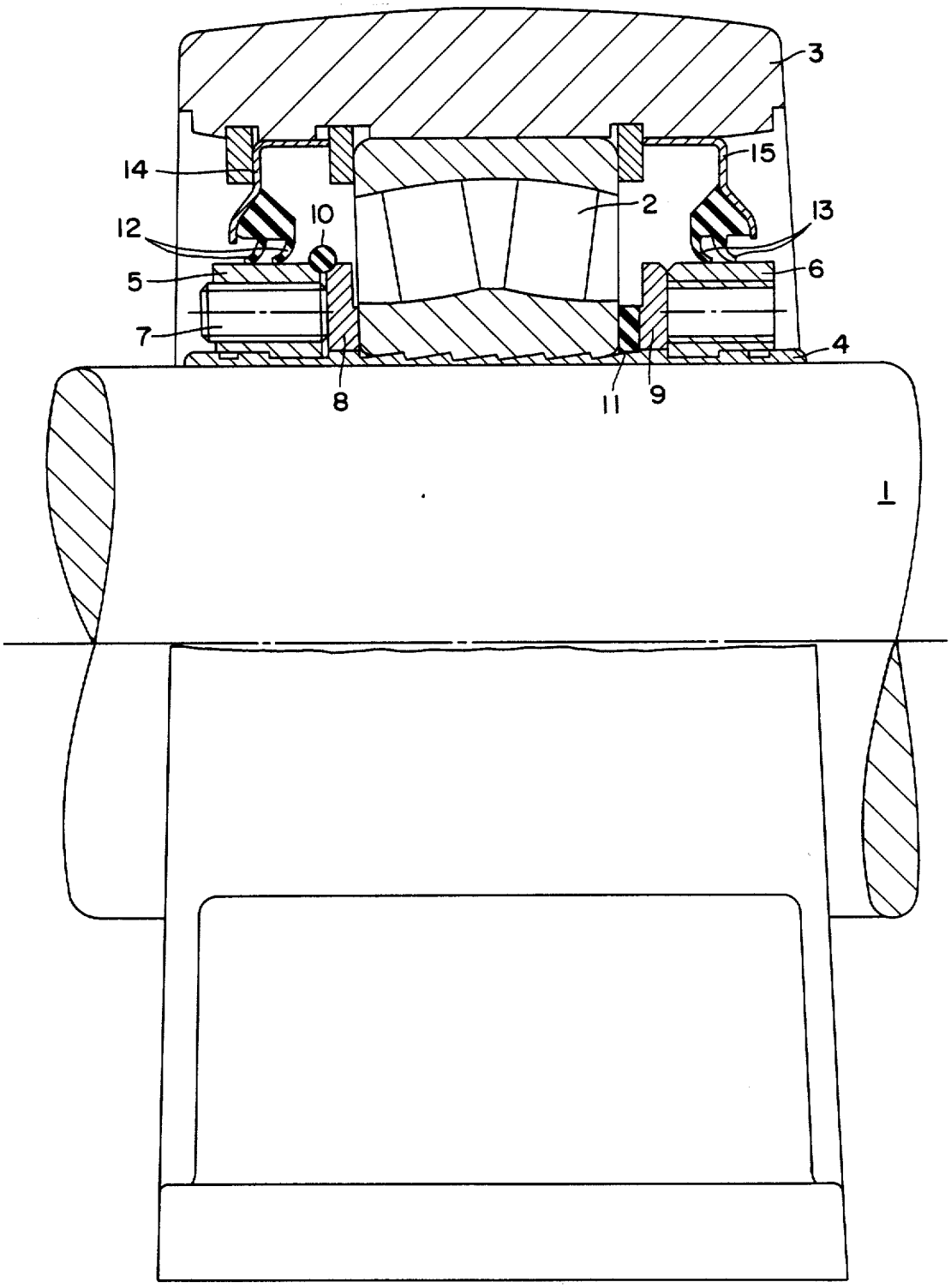
3
14
15
2
10
12
13
5
6
7
4
8
11
9
1

BEARING ARRANGEMENT WITH A SEAL

Matter enclosed in heavy brackets [ ] appears in the original patent but forms no part of this reissue specification; matter printed in italics indicates the additions made by reissue.

*FIELD OF THE INVENTION*

The invention relates to a device of the kind stated in the introductory clause of claim 1.

Such a device is known by e.g. the Swedish patent publication No. 8203074-3. FIG. 4 in that publication shows an arrangement by which a bearing can be mounted and dismounted easily. A disadvantage with the device is that the sealing members used give an uncertain sealing function, as the use of a clamping sleeve with a longitudinal slit allows contaminants to enter the bearing and/or allows lubricants to escape from the bearing through the slit along the shaft if the elements which are situated adjacent the side surfaces of the inner ring of the bearing are not fitting tightly against said side surfaces, which is difficult to achieve if the bearing is mounted by being displaced along the sleeve on the shaft.

The object of the invention is to provide a device of the kind mentioned above, by which the space which houses the bearing can be effectively sealed off also when the bearing is mounted on a slitted sleeve.

This is achieved by an arrangement comprising the characterizing features defined in claim 1.

A device according to the invention allows the bearing to be displaced on the clamping sleeve during mounting a desired distance without impairing the sealing function.

The following is a detailed description of the invention with reference to the accompanying drawing, which shows a longitudinal section of a device according to an embodiment of the invention.

A shaft 1 is mounted in a bearing 2 in a housing 3. The bearing, which is shown as a double-row spherical roller bearing, is mounted in a cylindrical seat in the housing and connected to the shaft by a clamping sleeve 4. The sleeve is slitted along its whole length in order to readily deformable radially. The bore of the inner ring of the bearing and the envelope surface of the clamping sleeve are shaped as co-operating clamping surfaces which are wedge-shaped in a longitudinal section. The surfaces are suitably conical, but may have other shapes. In the embodiment shown, the surfaces have saw-tooth longitudinal section profiles, which gives the clamping surfaces a small radial extension.

Mounting and dismounting of the bearing on the shaft is carried out by displacing the bearing in relation to the clamping sleeve. This can be done by the fact that the clamping sleeve is provided with flanges 5, 6 which are arranged on either side of the bearing. The flanges are axially fixed to the sleeve and provided with threaded bores into which set screws 7 may be screwed to direct or indirect contact with the side surfaces of the inner ring of the bearing 2. When screws in the bores in the flange 5 are tightened, the bearing is moved axially and squeezed against the shaft by the wedging action between the bearing and the clamping sleeve. During dismounting, screws are instead screwed through threaded bores in the flange 6, whereby the bearing is pushed back on the sleeve 4 and the clamping force ceases.

In order to avoid that the flanges influence the radial compressibility of the sleeve, the flanges are suitably separate elements which are loosely mounted in grooves in the sleeve. The diameter of the sleeve can thereby vary also in the areas surrounded by the flanges. A loose washer 8 whose side surfaces are shaped for suitable sealing contact against the inner ring of the bearing 2 and for taking up forces from set screws in the bores in the flange 5 is preferably arranged between the bearing and the flange 5. A resilient sealing and spring member 10, preferably in the shape of a rubber ring, is provided in a substantially V-shaped groove defined by chamfered edges on the flange 5 and the washer 8 or on the bearing inner ring, if the washer is absent. The rubber ring is mounted with a prestress in the groove, keeping the elements mounted on the sleeve in a certain prestress in their proper positions and permitting the displacement necessary for mounting or dismounting the bearing to take place without impairing the sealing function. Possible contaminants entering through the slit in the sleeve and spreading in the gap between the flange 5 and the washer 8 are prevented by the rubber ring 10 from entering the bearing. The rubber ring also prevents lubricants from escaping from the bearing the same way.

A second washer 9 is arranged between the flange 6 and the bearing 2 at the large end of the conical portion of the sleeve 4. The side surfaces of this washer are in contact against dismounting screws in the flange 6 and against a second sealing and spring member 11, which is situated between the washer 9 and the side surface of the inner ring of the bearing. The member 11 is compressible, so that the inner ring of the bearing can be moved axially during mounting on the clamping sleeve 4. It also acts as a seal between the washer 9 and the bearing. The fit between the washer 9 and the flange 6 is tight. Only when the bearing is dismounted can there by a gap between the flange and the washer. The sleeve with the bearing, flanges, washers and sealing members can constitute a self-contained unit which can be mounted to a shaft and dismounted off it in a simple manner.

The flanges 5, 6 have substantially cylindrical envelope surfaces at their outer confinements. Sealing members are provided in the housing 3 radially outside the flanges and surrounding them. [The] In a preferred embodiment, the sealing members comprise sealing lips 12, 13 which contact the cylindrical envelope surfaces. The lips are situated on resilient sealing parts which are fitted to sheet metal rings 14, 15. Each one of these rings has a cylindrical portion which fits into a seat in the housing, and a radially inwards extending portion which covers a portion of the shaft opening of the housing around the shaft. The resilient sealing parts are arranged on the inner edges of said radially extending portion.

By the fact that the sealing members are arranged in the same planes as the flanges 5, 6 and co-operate with these, axial space is saved. The seals do not require a greater radial space than the bearing 2, and, therefore, there is no need for an extra radial space in the housing 3. The sealing lips 12, 13 have a substantial radial resiliency which allows the flanges 5, 6 to be moved a comparatively long way radially without being obstructed by the seals, which permits the shaft 1 to be tilted in the housing as much as the self-aligning ability of the bearing 2 permits. The entire arrangement is surrounded by the housing 3 so, that no rotating parts extend outside the housing, which is a positive safety feature. The device completely encloses the bearing in the housing despite the fact that slitted sleeve is used as a mounting element.

What is claimed is:

1. A device for mounting a bearing (2) on a shaft (1) in a housing (3), comprising a tapered clamping sleeve (4) provided between the bearing and the shaft, the sleeve having a longitudinal slit and a flange (5,6) arranged on either side of the bearing, sealing members (12,13,14,15,) being arranged in the housing radially outside of the surrounding the flanges, sealing lips (12,13) contacting the outer surfaces of the flanges and members (7) for moving the bearing axially on the sleeve during mounting and dismounting of the bearing being provided in the flanges, characterized by a sealing part (11,9) arranged between the bearing and the flange (6) situated adjacent the large end of the tapered portion of the sleeve (4), the sealing part being compressible in the direction of motion of the bearing during mounting on the sleeve and sealingly abutting the bearing and the flange, and a resilient sealing ring (10) provided in a groove with a variable width and limited partly by the flange (5) situated adjacent the small end of the tapered portion of the sleeve and partly by the bearing (2) or a washer (8) situated adjacent and sealingly abutting the bearing.

2. A device according to claim 1, in which each sealing member comprises a sheet metal ring (14,15) with a cylindrical portion fitting into a cylindrical seat in the housing, and a portion extending radially inwards from said cylindrical portion and partly covering the opening between the shaft and the housing, said portion having an inner edge provided with a resilient sealing part having a lip (12, 13) contacting a cylindrical envelope surface of a flange.

3. A device according to claim 1, in which the sealing ring (10) is arranged in a V-shaped groove limited by chamfered edges on the flange (5) and the bearing (2) or washer (8).

*4. A device according to claim 1, wherein the sealing means comprises a sheet metal ring (14,15) with a cylindrical portion fitting into a cylindrical seat in the housing (3), and a portion extending radially inwards from said cylindrical portion and partly covering the opening between the shaft (1) and the housing (3), said portion having an inner edge provided with a resilient sealing part having a lip (12,13) contacting a cylindrical envelope surface of a flange (5,6).*

5. A device for mounting a bearing *(2) on a shaft (1) in a housing (3), comprising a tapered clamping sleeve (4) provided between the bearing (2) and the shaft (1), the sleeve (4) having a longitudinal slit and a flange (5,6) arranged on either side of the bearing (2), sealing means being provided radially outside of and surrounding the flanges (5,6) and members (7) for moving the bearing (2) axially on the sleeve (4) during mounting and dismounting of the bearing (2) being provided in the flanges (5,6), wherein a sealing part (11,9) arranged between the bearing (2) and the flange (6) situated adjacent the large end of the tapered portion of the sleeve (4), said sealing part being compressible in the direction of motion of the bearing (2) during mounting on the sleeve (4) and sealingly abutting the bearing (2) and the flange (6), and a resilient sealing ring (10) provided in a groove with a variable width and limited partly by the flange (5) situated adjacent the small end of the tapered portion of the sleeve (4) and partly by the bearing (2) or a washer (8) situated adjacent and sealingly abutting the bearing (2).*

* * * * *